United States Patent
Kray et al.

(10) Patent No.: US 7,780,410 B2
(45) Date of Patent: Aug. 24, 2010

(54) METHOD AND APPARATUS FOR GAS TURBINE ENGINES

(75) Inventors: Nicholas Joseph Kray, Cincinnati, OH (US); David William Crall, Loveland, OH (US); Daniel Edward Mollmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 777 days.

(21) Appl. No.: 11/616,607

(22) Filed: Dec. 27, 2006

(65) Prior Publication Data
US 2008/0159868 A1 Jul. 3, 2008

(51) Int. Cl.
*B64C 27/46* (2006.01)

(52) U.S. Cl. .................. 416/1; 416/2; 416/223 R; 416/224; 416/225; 415/9

(58) Field of Classification Search .............. 416/2, 416/223 R, 224, 225; 415/9
See application file for complete search history.

(56) References Cited

U.S. PATENT DOCUMENTS

| | | | | |
|---|---|---|---|---|
| 2,701,021 A | * | 2/1955 | Sargent | 416/2 |
| 4,022,540 A | * | 5/1977 | Young | 415/9 |
| 4,111,600 A | * | 9/1978 | Rothman et al. | 416/2 |
| 4,505,104 A | * | 3/1985 | Simmons | 415/9 |
| 5,405,102 A | * | 4/1995 | Greene | 416/2 |
| 6,240,719 B1 | | 6/2001 | Vondrell et al. | |
| 6,402,469 B1 | | 6/2002 | Kastl et al. | |
| 6,416,280 B1 | | 7/2002 | Forrester et al. | |
| 6,447,250 B1 | | 9/2002 | Corrigan et al. | |
| 6,457,942 B1 | | 10/2002 | Forrester | |
| 6,481,971 B1 | | 11/2002 | Forrester | |
| 6,520,742 B1 | | 2/2003 | Forrester et al. | |
| 6,634,863 B1 | | 10/2003 | Forrester et al. | |
| 7,114,912 B2 | * | 10/2006 | Gerez et al. | 415/9 |

* cited by examiner

*Primary Examiner*—Igor Kershteyn
(74) *Attorney, Agent, or Firm*—William Scott Andes, Esq.; Armstrong Teasdale LLP

(57) ABSTRACT

A method of assembling a gas turbine engine includes providing at least one blade assembly. The method also includes forming at least one blade tip fuse within at least a portion of the at least one blade assembly. The method further includes coupling the at least one blade assembly into the gas turbine engine. The blade assembly includes an airfoil and a metal leading edge (MLE) coupled to at least a portion of the airfoil. The MLE includes the at least one blade tip fuse.

17 Claims, 5 Drawing Sheets

METHOD AND APPARATUS FOR GAS TURBINE ENGINES

BACKGROUND OF THE INVENTION

This invention relates generally to gas turbine engines, and more particularly, to methods and apparatus for operating gas turbine engines.

At least some known gas turbine engines typically include an inlet, a fan assembly, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

Some known fan assemblies include a casing that encloses a plurality of blades coupled to a fan rotor wherein such blades may be subject to events that facilitate at least partial fan blade breakage. Such breakage facilitates primary damage which includes the affected blade and the immediately downstream blades as they contact the material released from the affected blade. Such primary damage may induce rotor unbalancing conditions and subsequent blade rubs against the fan casing. The blade rubs may facilitate secondary damage that includes damage to non-adjacent blades and the casing.

Many known fan assemblies are designed with a sufficient margin of error and constructed with sufficient additional load-carrying capabilities to compensate for such unbalanced rotor conditions and reduce a potential for damage in blade breakage events. Such additional load-carrying capabilities increase a cost of construction of the fan assemblies and decrease a gas turbine engine fuel efficiency due to the increased weight of the fan assemblies.

BRIEF DESCRIPTION OF THE INVENTION

In one aspect, a method of assembling a gas turbine engine is provided. The method includes providing at least one blade assembly. The method also includes forming at least one blade tip fuse within at least a portion of the at least one blade assembly. The method further includes coupling the at least one blade assembly into the gas turbine engine.

In another aspect, a blade assembly is provided. The blade assembly includes an airfoil and a metal leading edge (MLE) coupled to at least a portion of the airfoil. The MLE includes at least one blade tip fuse.

In a further aspect, a gas turbine engine is provided. The engine includes a rotor and a casing at least partially extending about the rotor. The engine also includes at least one blade assembly coupled to the rotor. The at least one blade assembly includes an airfoil and a metal leading edge (MLE) coupled to at least a portion of the airfoil. The MLE includes at least one blade tip fuse.

DETAILED DESCRIPTION OF THE INVENTION

Figure 1:
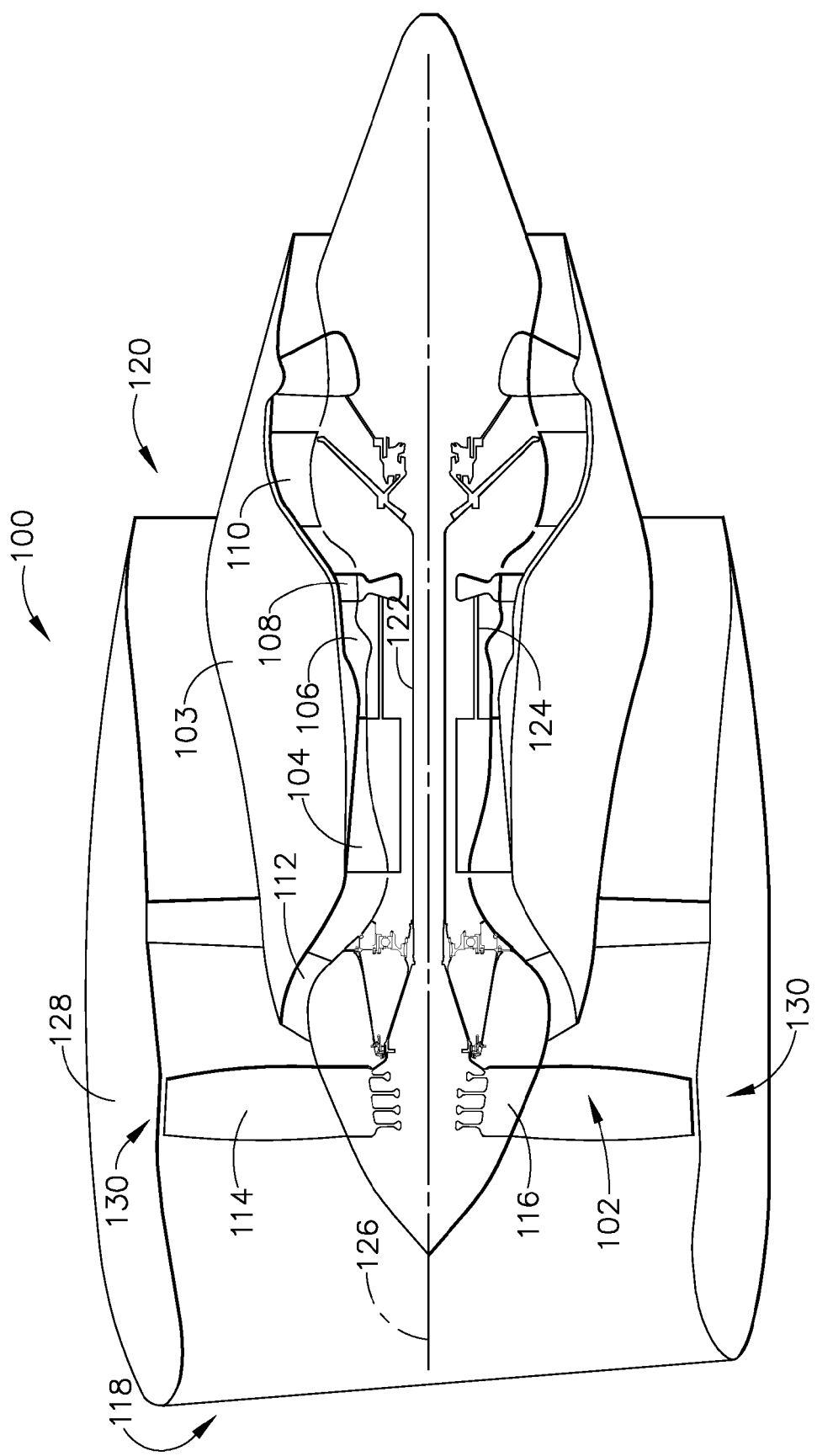
FIG. 1 is a schematic view of an exemplary gas turbine engine.

FIG. 1 is a schematic view of an exemplary gas turbine engine 100 including a fan 102 and a core engine 103 including a high pressure compressor 104, and a combustor 106. Engine 100 also includes a high pressure turbine 108, a low pressure turbine 110, and a booster 112. Fan 102 includes an array of fan blade assemblies 114 extending radially outward from a rotor disc 116. Engine 100 has an intake side 118 and an exhaust side 120. Fan 102 and turbine 110 are coupled together using a first rotor shaft 122, and compressor 104 and turbine 108 are coupled together using a second rotor shaft 124. Fan blade assemblies 114 and core engine 103 are at least partially positioned within an engine casing 128.

During operation, air flows axially through fan 102, in a direction that is substantially parallel to a central axis 126 extending through engine 100, and compressed air is supplied to high pressure compressor 104. The highly compressed air is delivered to combustor 106. Airflow (not shown in FIG. 1) from combustor 106 drives turbines 108 and 110. Turbine 110 drives fan 102 by way of shaft 122 and similarly, turbine 108 drives compressor 104 by way of shaft 124. Fan blade assemblies 114 rotate within casing 128 such that a substantially annular clearance 130 is formed. A radial distance (not shown) of clearance 130 is substantially circumferentially equidistant about central axis 126.

Figure 2:
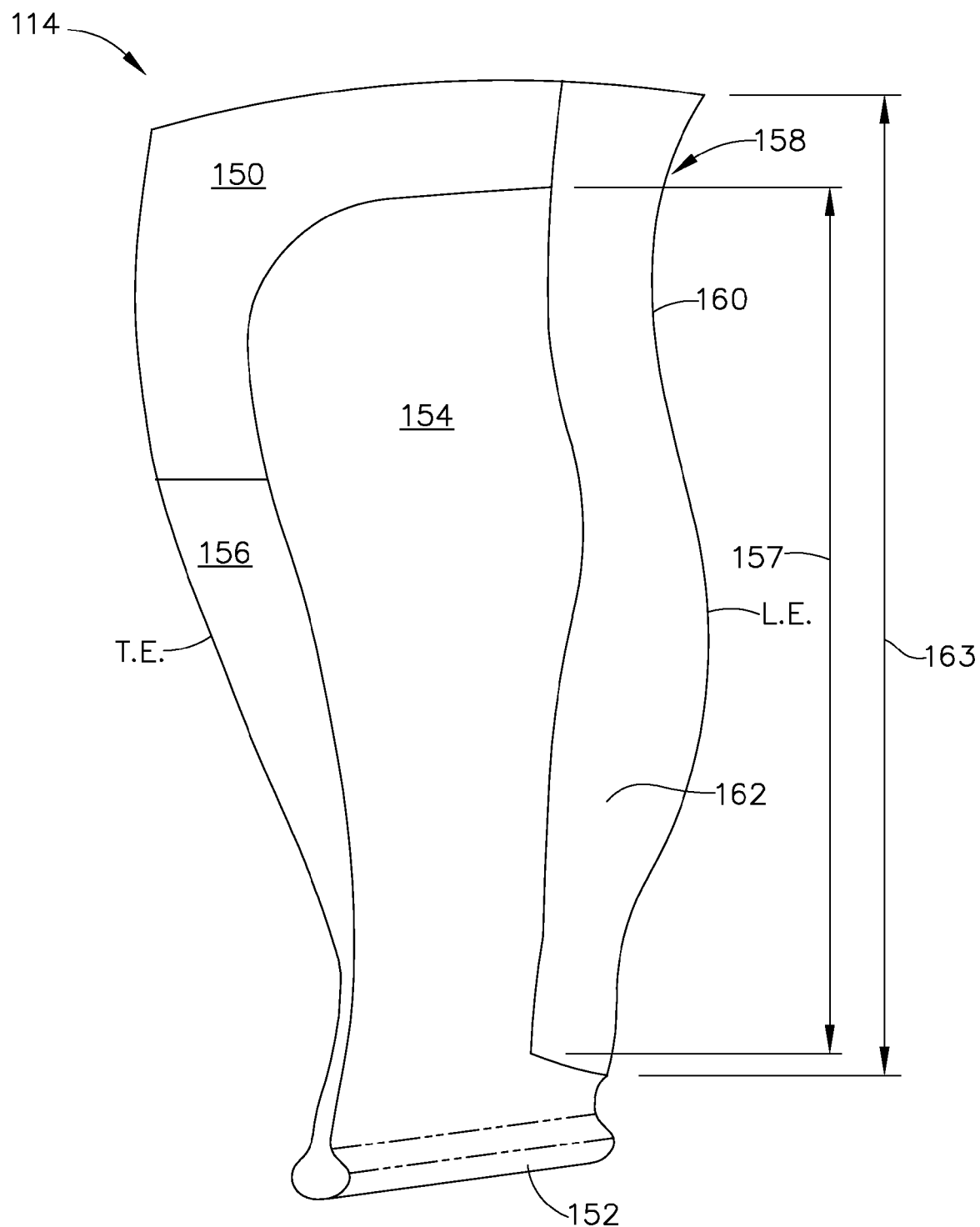
FIG. 2 is a schematic view of an exemplary fan blade assembly that may be used with the gas turbine engine shown in FIG. 1.

FIG. 2 is a schematic view of exemplary fan blade assembly 114 that may be used with engine 100 (shown in FIG. 1). Each of fan blade assemblies 114 include a blade tip cap 150 that cooperates with an innermost surface (not shown) of casing 128 to form clearance 130 (both shown in FIG. 1) therebetween. In the exemplary embodiment, cap 150 is formed from titanium sheet metal. Alternatively, cap 150 is formed from any material that facilitates operation of assembly 114 as described herein. Assembly 114 also includes a dovetail root portion 152 that facilitates coupling assemblies 114 to rotor disc 116 as is known in the art. Assembly 114 further includes an airfoil 154 that is formed from materials via processes that are both known in the art. Such materials include, but are not limited to, composites. Assembly 114 also includes a trailing edge guard 156. In the exemplary embodiment, guard 156 is formed from titanium sheet metal. Alternatively, guard 156 is formed from any material that facilitates operation of assembly 114 as described herein. Airfoil 154 has a first radial length 157.

Assembly 114 further includes a metal leading edge (MLE) 158. MLE 158 is formed from any metallic material that facilitates operation of fan 102 as described herein, including, but not being limited to, titanium alloys and inconel alloys. Specifically, MLE 158 includes a predetermined tangential stiffness that is discussed further below. MLE 158, as well as cap 150 and guard 156, are coupled to airfoil 154 via methods known in the art, wherein such methods include, but are not limited to, brazing, welding, and adhesive bonding. MLE 158 includes a solid nose region 160 and a plurality of sidewalls 162 (only one facing sidewall 162 shown in FIG. 1). MLE 158 extends along substantially all of airfoil radial length 157. Moreover, a radially innermost portion of MLE 158 extends radially inward to root portion 152 and a radially outermost portion of MLE 158 extends radially outward such that MLE 158 is substantially flush with cap 150. Therefore, in the exemplary embodiment, MLE 158 is configured with a second radial length 163 that is greater than first radial length 157. Alternatively, length 163 is any value that facilitates operation of assembly 114 as described herein.

Figure 3:
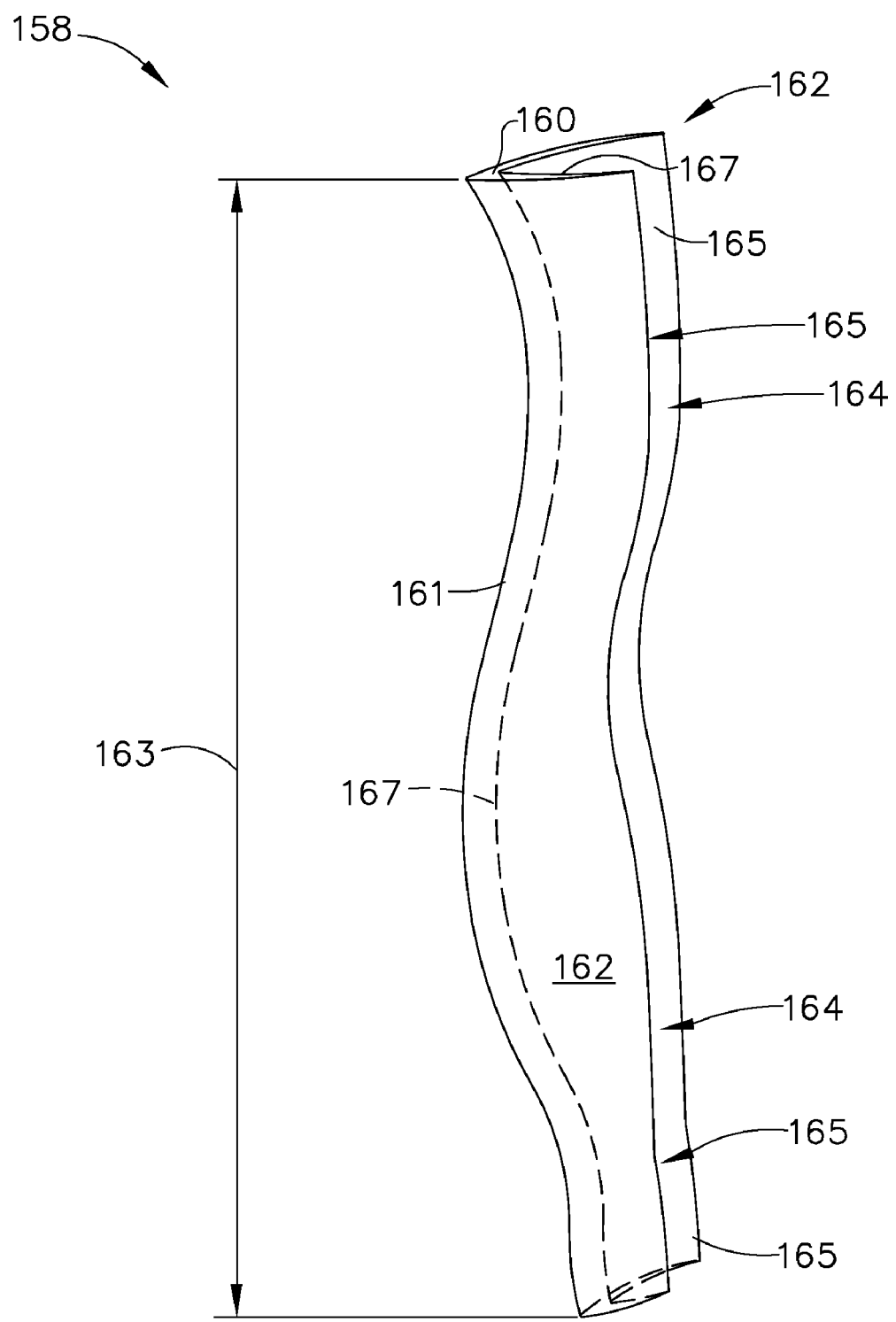
FIG. 3 is a schematic view of an exemplary metal leading edge (MLE) that may be used with the fan blade assembly shown in FIG. 2.

FIG. 3 is a schematic view of exemplary metal leading edge (MLE) 158 that may be used with fan blade assembly 114 (shown in FIG. 2). FIG. 3 illustrates a slightly skewed perspective of MLE 158 for clarity. Solid nose region 160 is configured with and external apex 161 and a second radial length 163 as described above. Sidewalls 162 are configured with a predetermined of a thickness (not shown) that is determined as discussed further below. Sidewalls 162 are also configured with a predetermined taper (not shown) located on an inner surface 165 of sidewalls 162. The taper facilitates substantially smoothing a stress profile (not shown) along the entire periphery of the airfoil-to-MLE interface (not shown). Sidewalls inner surfaces 165 and solid nose portion 160 form an internal apex 167. MLE 158 also includes a cavity 164 that is formed by inner surfaces 165 and apex 167. Cavity 164 facilitates coupling MLE 158 to airfoil 154 by facilitating conforming MLE 158 to the configuration of airfoil 154. Therefore, cavity 164 varies with variations in the taper of inner surfaces 165, radial length 163, the contours of apex 167 and the contours of airfoil 154.

MLE 158 is configured with a predetermined tangential stiffness such that it can meet and withstand a continuous inrush of air pulled into engine 100 via intake side 118 (both shown in FIG. 1). Such tangential stiffness may also be sufficient to withstand collisions with solid foreign objects inadvertently pulled into engine 100 and high speed contact with casing 128 (shown in FIG. 1). The tangential stiffness of MLE 158 may be varied by changing a radial length of solid nose region 160 away from length 163. Moreover, the tangential stiffness of MLE 158 may be varied by changing the thickness of sidewalls 162 as a function of second radial length 163. For example, decreasing the radial length of solid nose region 160 away from radial length 163 decreases the tangential stiffness of MLE 158. Moreover, decreasing the thickness of sidewalls 162 decreases the tangential stiffness of MLE 158. Therefore, altering the radial length of solid nose region 160 and the thickness of sidewalls 162 as a function of radial length 163 alters the tangential stiffness of MLE 158 as a function of radial length 163.

Figure 4:
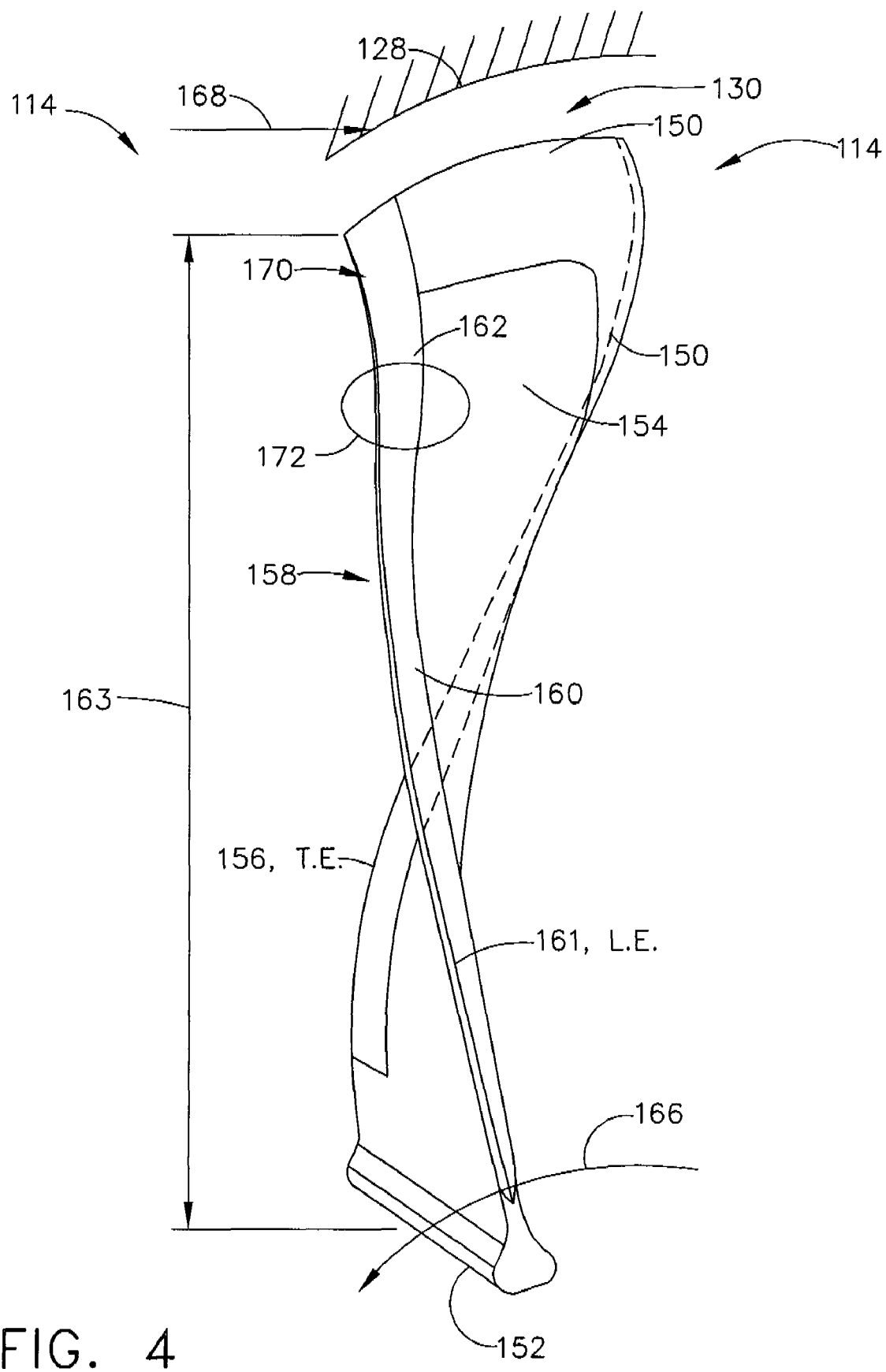
FIG. 4 is a schematic view of the fan blade assembly shown in FIG. 2 from a different perspective than that of FIG. 2.

FIG. 4 is a schematic view of fan blade assembly 114 from a different, or more axial, perspective than that of FIG. 2 (which is more radial) for clarity. Direction of rotation 166 of fan 102 is illustrated with an arrow. As described above, blade tip cap 150 and casing 128 cooperate to form clearance 130 therebetween. Unbalanced conditions within engine 100 (shown in FIG. 1) may facilitate a decrease in a radial distance between tip cap 150 and casing 128 thereby increasing a probability of contact, or rub, between cap 150 and casing 128. Such rubbing will induce a force, or load 168, wherein a least a portion of such load will be transferred into casing 128 and a portion into assembly 114 as is discussed further below.

Fan blade assembly 114 includes a load reduction device (LRD) in the form of a blade tip fuse 170. Fuse 170 is configured to facilitate removal of a predetermined portion of airfoil 154 in the event that load 168 attains a predetermined value. Fuse 170 includes a hinge mechanism 172 positioned at a predetermined point along radial length 163. Hinge mechanism 172 is characterized by the yield strength of MLE 158 being exceeded beyond the point wherein plastic deformation of the associated material is induced. Methods of inducing plastic deformation include, but are not limited to, bending the metal sufficiently and crippling the material, that is, notching a small slot on the cavity side of MLE 158. These methods induce a tendency within MLE 158 to bend away from airfoil 154 in contrast to standing substantially straight when subjected to predetermined values of load 168.

An exemplary method of assembling gas turbine engine 100 includes providing at least one blade assembly 114. The method also includes forming at least one blade tip fuse 170 within at least a portion of blade assembly 114. The method further includes coupling blade assembly 114 into gas turbine engine 100.

In operation, assembly 114 rotates in the direction of rotation 166 as illustrated by the arrow. Typically, clearance 130 remains substantially constant with the exception of minor variations due to small engine 100 imbalances. In the event that a foreign object impacts at least one assembly 114, such assembly 114 may be damaged, that is, a bladeout event may occur. Such breakage facilitates primary damage which includes the affected blade and the immediately downstream blades as they contact the material released from the affected blade. Typically, a bladeout event initiates an engine shutdown sequence. Moreover, such primary damage may induce rotor unbalancing conditions and subsequent blade rubs against the fan casing. Therefore, in such an event, an imbalance of engine 100 will likely be induced such that second rotor shaft 124 (shown in FIG. 1) deflects out of an orbit at least partially defined by axis 126 (shown in FIG. 1). Such deflection may be of sufficient magnitude to facilitate at least one other assembly 114 to impact, or rub, casing 128, that is, such deflection may induce a LRD trigger event. Such blade assembly 114 rubs may facilitate secondary damage that includes damage to non-adjacent blades and the casing. Cap 150 of the rubbing assemblies 114 will be subjected to sufficient force to be substantially removed from assembly 114. Such cap 150 removal will reduce force 168 acting on casing 128. Upon ejection of cap 150 from assembly 114, shaft 124 will be permitted to deflect further away from the orbit at least partially defined by axis 126 such that MLE 158 contacts casing 128. Fuse 170 facilitates MLE 158 bending away from assembly 114 such that airfoil 154 contacts casing 128, thereby mitigating formation of a secondary load path to casing 128 from assemblies 114, decreasing the portion of load 168 transmitted to casing 128, and decreasing a potential for damage to casing 128. As airfoil 154 contacts casing 128, airfoil 154 erodes thereby further increasing a range of deflection of shaft 124.

While the action described above facilitates sacrificial erosion of fan blade assemblies 114 at airfoil 154, increasing the range of deflection of shaft 124 facilitates decreasing loads on the engine mounts (not shown). Moreover, removing materials with strength characteristics similar to those of casing 128, for example, cap 150 and MLE 158, and permitting softer materials, for example airfoils 154, to contact casing 128 reduces the potential for substantial damage to casing 128. Furthermore, erosion of predetermined portions of airfoils 154 to predetermined lengths with a subsequent release of a predetermined weight of airfoil 154 material may facilitate a reduction of the imbalance while engine 100 shuts down, thereby decreasing a potential for further damage.

Figure 5:
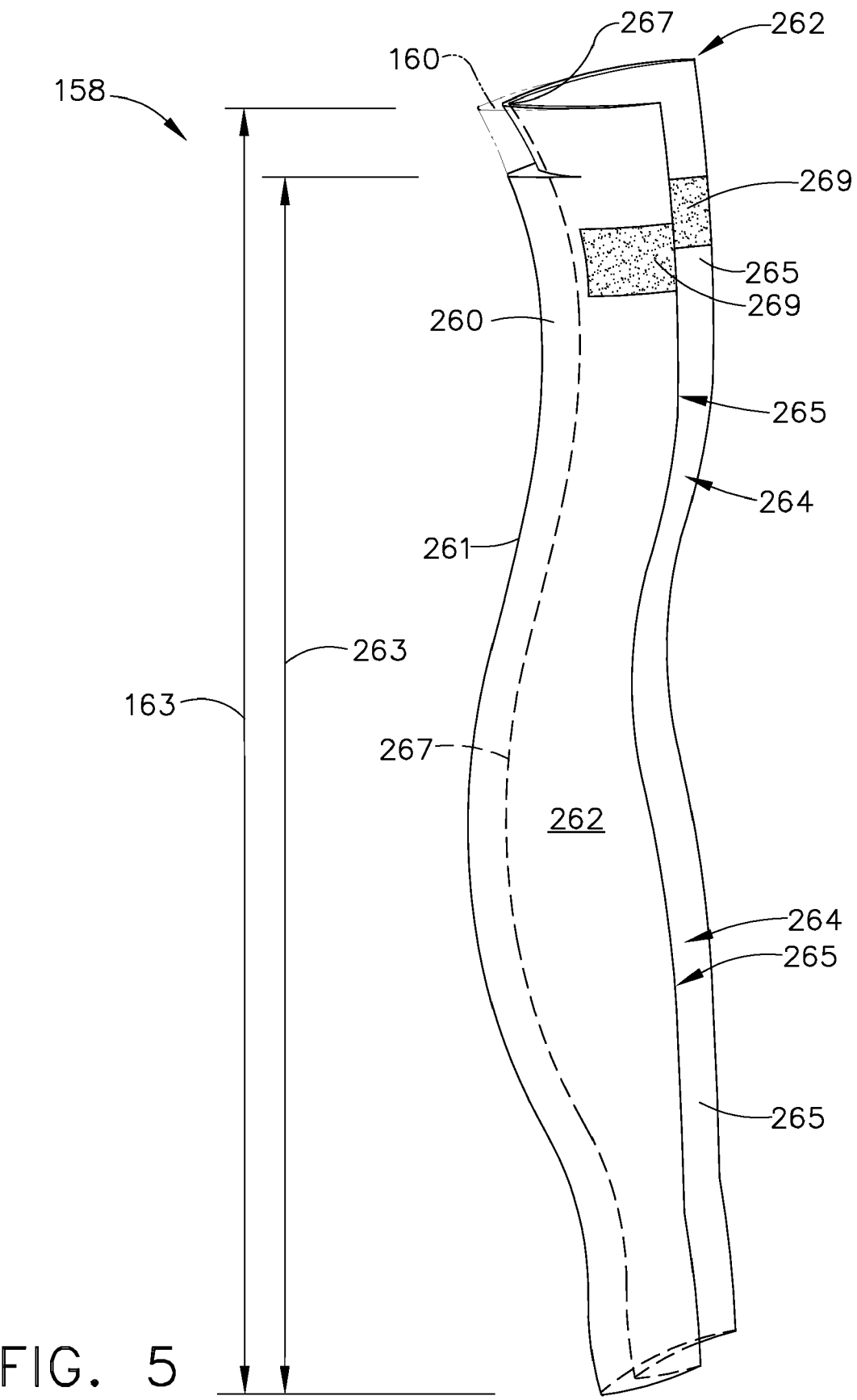
FIG. 5 is a schematic view of an alternative MLE that may be used with the fan blade assembly shown in FIG. 2.

FIG. 5 is a schematic view of an alternative MLE 258 that may be used with fan blade assembly 114 (shown in FIG. 2). In this alternative embodiment, the tangential stiffness of MLE 158 (shown in FIGS. 3 and 4) is decreased by decreasing a third radial length 263 of solid nose region 260 away from second radial length 163, thereby at least partially forming MLE 258. The portion of region 160 that is removed to at least partially form region 260 is illustrated in phantom. Moreover, in this alternative embodiment, the tangential stiffness of MLE 158 is decreased by decreasing a wall thickness of sidewalls 162 (shown in FIGS. 3 and 4) within a predetermined region 269 of each sidewall 162 and sidewall inner surfaces 265 to form sidewalls 262 and inner surfaces 265, respectively. Furthermore, in this alternative embodiment, cavity 264 is at least partially formed by inner surfaces 265 and an apex 267. Either method of decreasing tangential stiffness of MLE 158 to form MLE 258 may be used individually or in conjunction. The predetermined radial length 263 and the predetermined thicknesses of regions 269 cooperate with hinge mechanism 172 to form fuse 170 (both shown in FIG. 4).

The methods and apparatus for operating gas turbine engines as described herein facilitates operation of aircraft engines. Specifically, configuring fan blade assemblies with metal leading edges as described herein facilitates reducing an extent of damage to an engine casing in the event of a LRD trigger event. More specifically, such configuration facilitates forming a predetermined fan blade assembly failure region that reduces the amount of load transferred to the casing during LRD trigger events. Furthermore, such configuration decreases engine imbalance and facilitates permitting a larger orbit deflection for the engine rotor.

Exemplary embodiments of operating gas turbine engines are described above in detail. The methods, apparatus and systems are not limited to the specific embodiments described herein nor to the specific illustrated gas turbine engines and engine components.

While the invention has been described in terms of various specific embodiments, those skilled in the art will recognize that the invention can be practiced with modification within the spirit and scope of the claims.

What is claimed is:

1. A method of assembling a gas turbine engine, said method comprises:
   providing at least one blade assembly;
   coupling at least a portion of a metal leading edge (MLE) to at least an airfoil portion of the blade assembly;
   forming at least one blade tip fuse within at least a portion of the at least one blade assembly using at least one hinge mechanism within a portion of the MLE, wherein a first portion of the MLE is formed with a first tangential stiffness and a second portion of the MLE is formed with a second tangential stiffness that is less than the first tangential stiffness; and
   coupling the at least one blade assembly into the gas turbine engine.

2. A method in accordance with claim 1 wherein forming a second portion of the MLE with a second tangential stiffness comprises at least one of:
   forming a notch in at least a portion of the MLE;
   deforming at least a portion of the MLE;
   thinning a portion of the MLE; and
   varying the size of at least a portion of the MLE.

3. A method in accordance with claim 1 wherein forming at least one blade tip fuse further comprises forming the at least one blade tip fuse to deform when subjected to a predetermined load.

4. A method in accordance with claim 3 wherein providing at least one blade assembly comprises further providing at least one blade assembly fabricated from a material that erodes when subjected to a predetermined load.

5. A method in accordance with claim 1 wherein coupling the at least one blade assembly into the gas turbine engine comprises coupling the at least one blade assembly within the gas turbine engine to facilitate mitigating gas turbine engine imbalances.

6. A blade assembly comprising:
   an airfoil; and
   a metal leading edge (MLE) coupled to at least a portion of said airfoil, said MLE comprises at least one blade tip fuse wherein a first portion of the MLE is formed with a first tangential stiffness and a second portion of the MLE is formed with a second tangential stiffness that is less than the first tangential stiffness.

7. A blade assembly in accordance with claim 6 wherein said MLE is configured to deform when said blade assembly is subjected to a predetermined load.

8. A blade assembly in accordance with claim 7 wherein said MLE further comprises at least one hinge mechanism configured to facilitate deformation of said MLE when said blade assembly is subjected to a predetermined load.

9. A blade assembly in accordance with claim 6 wherein said MLE comprises at least one of:
   a solid nose region; and
   at least one sidewall.

10. A blade assembly in accordance with claim 6 wherein said airfoil is configured to erode at a predetermined rate when subjected to a predetermined load.

11. A blade assembly in accordance with claim 6 wherein said blade assembly is configured for insertion into a rotating machine, said blade assembly is further configured to mitigate imbalances within the rotating machine.

12. A gas turbine engine comprising:
   a rotor;
   a casing at least partially extending about said rotor; and
   at least one blade assembly coupled to said rotor, said at least one blade assembly comprises:
      an airfoil; and
      a metal leading edge (MLE) coupled to at least a portion of said airfoil, said MLE comprises at least one blade tip fuse wherein a first portion of the MLE is formed with a first tangential stiffness and a second portion of the MLE is formed with a second tangential stiffness that is less than the first tangential stiffness.

13. A gas turbine engine in accordance with claim 12 wherein said MLE is configured to deform when said blade assembly is subjected to a predetermined load.

14. A gas turbine engine in accordance with claim 13 wherein said MLE further comprises at least one hinge mechanism configured to facilitate deformation of said MLE when said blade assembly is subjected to a predetermined load.

15. A gas turbine engine in accordance with claim 12 wherein said MLE comprises at least one of:
   a solid nose region; and
   at least one sidewall.

16. A gas turbine engine in accordance with claim 12 wherein said airfoil is configured to erode at a predetermined rate when subjected to a predetermined load.

17. A gas turbine engine in accordance with claim 12 said blade assembly is configured for insertion into a rotating machine, said blade assembly is further configured to mitigate imbalances within the rotating machine.

* * * * *